United States Patent Office 3,408,380
Patented Oct. 29, 1968

3,408,380
PREPARATION OF FLUOROSILANES
Allen G. Pittman, El Cerrito, and William L. Wasley, Berkeley, Calif., assignors to the United States of America as represented by the Secretary of Agriculture
No Drawing. Filed Mar. 17, 1966, Ser. No. 535,038
6 Claims. (Cl. 260—448.2)

A nonexclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of processes for preparing organic and inorganic fluorosilanes. Further objects of the invention will be evident from the following description wherein parts and percentages are by weight unless otherwise specified.

In accordance with the invention, chloro- (or bromo-) silanes are converted into the corresponding fluorosilanes by a simple yet effective process which involves reaction of the starting compound with an adduct of a fluoroacetone and a metal fluoride. A typical example of the synthesis is the reaction of trimethylchlorosilane with the adduct of hexafluoroacetone and potassium fluoride to produce trimethylfluorosilane:

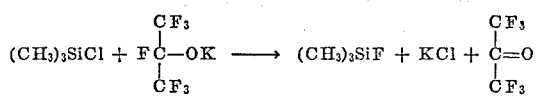

The process of the invention is by no means limited to the above example but can be applied to produce many different types of fluorosilanes. Thus, the invention may be employed to yield any of the fluorosilanes of the formula:

$$(R)_{4-n}SiF_n$$

(wherein R is a monovalent hydrocarbon radical and $n$ is 1, 2, 3, or 4) starting from a halosilane of the formula:

$$(R)_{4-n}SiY_n$$

wherein R and $n$ are as above and Y is chlorine or bromine. It is obvious that when $n$ is 4, the product is the inorganic compound silicon tetrafluoride, $SiF_4$.

Generically, the adduct used to supply the fluorine for replacement of the chlorine (or bromine) bonded to Si has the structure:

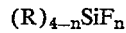

wherein X is a halogen and M is an alkali metal. The active fluorine in this compound, i.e., the one that replaces the chlorine (or bromine) in the silane is the fluorine at the alpha position (marked by an asterisk in the above formula). The fluorine groups on the beta carbon atoms do not enter into the reaction but their presence is necessary to activate the alpha position so that the desired synthesis can take place. These adducts, which may also be termed fluorocarbinolates, are readily prepared by reaction of an alkali metal fluoride with the corresponding fluoroacetone, for example, hexafluoroacetone, sym-dichlorotetrafluoroacetone, beta-chloropentafluoroacetone, or other perhaloacetone which responds to the formula:

$$CF_2X—CO—CF_2X$$

wherein X is halogen. However, the preparation of these adducts of fluorocarbinolates is not a part of this invention. Their preparation is described and claimed in our copending application Ser. No. 398,129, filed Sept. 21, 1964 now U.S. Patent 3,384,628.

Generically, the process of the present invention may be demonstrated by the following equation:

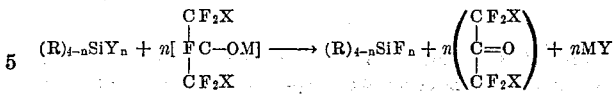

In the above formulas:

X is a halogen,
M is an alkali metal,
R is a monovalent hydrocarbon radical such as methyl, ethyl, propyl, ispropyl, butyl, hexyl, octyl, decyl, dodecyl, or other alkyl radical; vinyl, allyl, oleyl, or other unsaturated radical; cyclohexyl, methylcyclohexyl, or other cycloalkyl radical; phenyl, tolyl, ethylphenyl, isopropyl phenyl, xylyl, zenyl, naphthyl, styryl, or other aromatic or substituted-aromatic radical; benzyl, phenylethyl, or other aralkyl radical; etc.
Y is chlorine or bromine, and
$n$ is an integer from 1 to 4.

In carrying out the process of the invention, it is simply necessary to contact the adduct with the chloro- (or bromo-) silane. The conditions of reaction are not critical, other than that moisture should be excluded to avoid hydrolysis of the starting silane or the adduct. Usually, the reaction is carried out for convenience at about room temperature or slightly higher, i.e., in the range from about 20° C. to about 40° C. However, this range is not critical and the temperature can be higher or lower. It is obvious, of course, that the temperature should not be so high as to decompose the starting materials or the product. Usually, it is preferred to carry out the reaction in the presence of an inert solvent to attain good contact between the reactants. Suitable solvents are, for example, acetone, dimethyl ether of diethylene glycol, acetonitrile, N,N-dimethylformamide, and the like.

As evident from the generic equation above, the proportions of silane and adduct to be used will depend on the number of chlorine (or bromine) atoms in the silane. For example, with the monochlorosilane the adduct is used in equimolar proportion, with a dichlorosilane the adduct is used in twice the equimolar proportion, and so forth. In any case, the proportion of adduct may be in excess of the stoichiometrical amount to ensure complete replacement of the starting chlorine or bromine atoms by fluorine. A significant advantage of the process is that the original fluoroacetone is re-formed in the reaction and can be recovered and readily converted into another batch of adduct.

The fluorosilanes produced in accordance with the invention are known compounds which have many uses. For example, they are useful in synthesizing silicon derivatives in reactions where the corresponding chloro- (or bromo-) silanes cannot be used because of the tendency of the latter to hydrolyze.

The invention is further illustrated by the following examples. The expression "diglyme" used below is an abbreviation for the dimethyl ether of diethylene glycol.

EXAMPLE 1

(A) Preparation of hexafluoroacetone-KF adduct.—A 250-ml., round bottom flask equipped with a stirring bar, Dry-Ice condenser, gas inlet, and rubber septum was charged with 5.8 g. (0.1 mole) of anhydrous KF. The flask was placed under vacuum and heated with a burner to remove moisture. After allowing the flask to cool to room temperature, nitrogen was bled into the system and 45 ml. of anhydrous diglyme was introduced. The condenser jacket was filled with Dry Ice and 16.6 g. (0.1 mole) of hexafluoroacetone was added slowly through the gas inlet. After the addition, the contents of the flask were stirred until there was no more dispersed KF evident in the flask and there was no more evidence of free hexafluoroacetone. The product of the reaction was the hexafluoroacetone-KF adduct

(B) Preparation of triethylfluorosilane.—At this point, the Dry-Ice condenser was replaced with a water condenser which was connected to a Dry-Ice trap. Triethylchlorosilane (15 g., 0.1 mole) was then added slowly with a syringe to the stirred mixture containing the adduct. Upon addition of the chlorosilane there occurred an immediate precipitation of KCl and evolution of hexafluoroacetone. The mixture was stirred an additional 30 minutes at 35–40° C. and then the product plus some diglyme was removed from the slurry by vacuum distillation. Redistillation yielded 12 g. (90%) of triethylfluorosilane, B.P. 108–109° C. at 760 mm. Thirteen and one-half grams of hexafluoroacetone was recovered in the Dry-Ice trap.

EXAMPLE 2

The procedure of Example 1 was repeated, using anhydrous acetone as the solvent in place of diglyme. The reaction product was not distilled but was filtered free from KCl and analyzed by gas chromatography. The chromatogram revealed, excluding the solvent, 94.2% of triethylfluorosilane and 5.8% of an unidentified lower boiling compound. There was no indication of unreacted triethylchlorosilane.

EXAMPLE 3

A 250-ml., 3-neck flask equipped with a water condenser, magnetic stirring bar and dropping funnel was charged with 11.6 g. (0.2 mole) KF and dried under vacuum. One-hundred eighty ml. of dry diglyme was introduced, followed by the slow addition of 40 g. (0.2 mole) of sym-dichlorotetrafluoroacetone. After formation of the adduct

was complete, as evidenced by the disappearance of dispersed KF, 30 g. (0.2 mole) of triethylchlorosilane was added slowly to the stirred solution. As in Example 1, there was an immediate precipitation of KCl on addition of the chlorosilane. Product and solvent were removed from the salt slurry by vacuum distillation and collected in a flask cooled by Dry Ice. Redistillation yielded 27 g. sym-dichlorotetrafluoroacetone, B.P. 45° C., and 24.5 g. of a fraction, B.P. 109–120°. This fraction was analyzed by gas chromatography and found to contain 91.1% triethylfluorosilane and 8.9% diglyme.

EXAMPLE 4

The procedure of Example 1 was repeated but substituting various halosilanes for the triethylchlorosilane. The starting compounds used and the results are summarized below. The abbreviation "Et" signifies the ethyl radical.

| Starting halosilane | Proportion of hexafluoroacetone-KF adduct to halosilane, mole/mole | Product | Yield, percent |
|---|---|---|---|
| $(CH_3)_3SiCl$ | 1/1 | $(CH_3)_3SiF$ | 70 |
| $Et_3SiBr$ | 1/1 | $Et_3SiF$ | 69 |
| $Et_2SiCl_2$ | 2/1 | $Et_2SiF_2$ | 72 |
| Phenyl-$SiCl_3$ | 3/1 | Phenyl-$SiF_3$ | 75 |

Having thus described the invention, what is claimed is:
1. The process which comprises reacting under anhydrous conditions,
(I) a compound of the formula

wherein X is a halogen and
M is an alkali metal, with
(II) a compound of the formula,

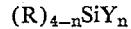

wherein R is a monovalent hydrocarbon radical,
Y is a member of the group consisting of chlorine and bromine, and
$n$ is an integer from 1 to 4, to produce
(III) a compound of the structure

wherein R and $n$ are as above defined.

2. The process of claim 1 wherein

X is fluorine,
R is alkyl,
Y is chlorine, and
$n$ is 1.

3. The process of claim 1 wherein

X is chlorine,
R is alkyl,
Y is chlorine, and
$n$ is 1.

4. The process of claim 1 wherein

X is fluorine,
R is alkyl,
Y is bromine, and
$n$ is 1.

5. The process of claim 1 wherein

X is fluorine,
R is alkyl,
Y is chlorine, and
$n$ is 2.

6. The process of claim 1 wherein

X is fluorine,
R is phenyl,
Y is chlorine, and
$n$ is 3.

No references cited.

TOBIAS E. LEVOW, *Primary Examiner.*

J. P. PODGORSKI, *Examiner.*